June 23, 1959 W. H. CARTER, JR 2,892,086
SEALED RADIOACTIVITY SAMPLE CHAMBER
Filed May 23, 1957
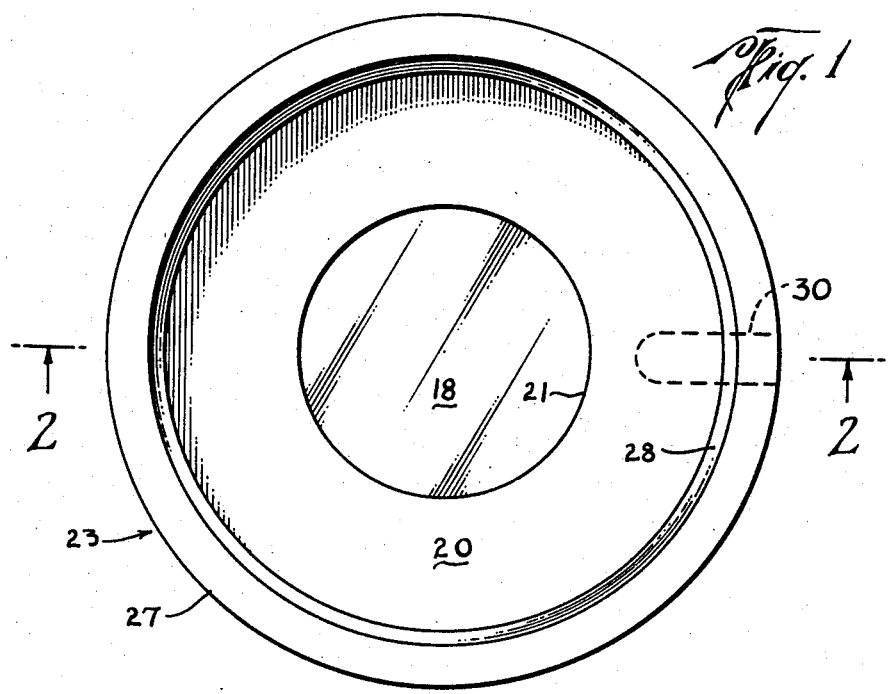
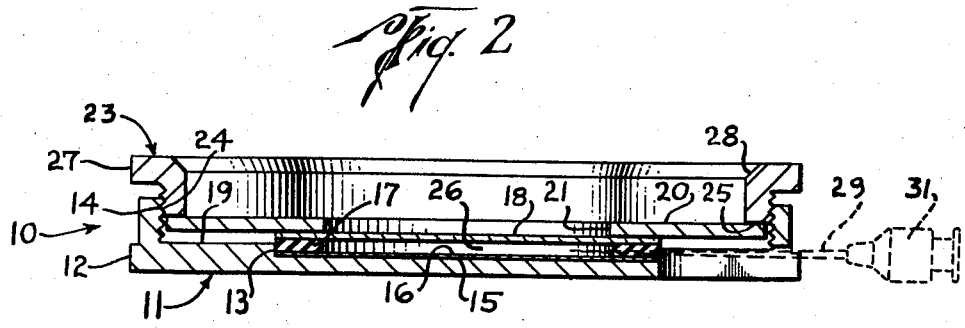
William H. Carter, Jr.
INVENTOR.
BY Wm. E. Ford
ATTORNEY ns
Patented June 23, 1959

2,892,086
SEALED RADIOACTIVITY SAMPLE CHAMBER
William H. Carter, Jr., Houston, Tex.
Application May 23, 1957, Serial No. 661,153
8 Claims. (Cl. 250—44)

This invention relates to a sealed, radioactivity sample chamber, in which a radioactive sample, as a liquid sample, may be tested as by the inert gas of a Geiger counter.

The invention has as its primary object the provision of a sealed, radioactivity sample chamber which provides ample space for a sample of adequate size to be placed therein for testing; which permits ready and facile change over from observation of one sample to observation of another sample; which provides for the best possible geometry in the testing of weak samples, and which provides a structure easily cleaned of contamination from radioactive material.

Another object of the invention is to provide such a sample chamber permitting the insertion of a liquid sample by use of a hypodermic needle.

It is still another object to provide such a sample chamber which is constructed to exert even pressure in maintaining its disc upon its gasket without bowing.

It is still a further object to provide a sample chamber which is of simple construction, easily assembled and disassembled, and of a size and shape to fit in the planchet holder of a Geiger counter.

Other and further objects will be apparent when the herein specification is considered in connection with the accompanying drawings in which:

Fig. 1 is a plan view of a form of the invention; and
Fig. 2 is a sectional elevation taken along line 2—2 of Fig. 1.

Referring in detail to the drawings, a sample chamber 10 is shown as having a base or base housing 11, which may be of metal, or which may be of a plastic preferably unaffected by, and having no effect upon radioactive material. Such base has a rim or flange 12 thereon for ease of handling and a cylindrical recess 13 bored therein. Outwardly of the recess 13 the base housing 11 has a threaded counterbore 14, for a purpose to be hereinbelow described.

A disposable shield or liner 16, as of aluminum foil, seats upon, and covers the bottom or base 15 of the recess 13. Such liner minimizes cleaning problems since it may be easily cleaned of radioactive material when removed, or else such liner may be expended altogether. An annular gasket 17 of a self-sealing material, as gum latex, prepared leather, treated rubber, neoprene, and the like is provided to seat upon the peripheral surface of the liner 16. Preferably the gasket 17 is of thickness to seat upon the liner 16 and extend above the base surface 19. A membrane disc 18 seats upon the gasket 17, such membrane being of a material, as Pliofilm, which will permit the passage of rays of radioactivity, as alpha, beta, or gamma rays therethrough. The disc material may otherwise be purely of cellophane, or any other material which may tend to pass rays as weak as alpha and beta rays.

A hold-down ring or pressure washer 20, having a bore 21 therethrough of substantially the inner diameter of the gasket 17, is provided to seat upon the gasket 17. The washer 20 has an outer diameter slightly less than the inner, threaded diameter 14 of the base housing 11, so that when a top, tubular member, or pressure ring 23, which is externally threaded at 24, is threaded into the threaded counterbore 14, its inner, lower face 25 seats upon the pressure washer 20 to firmly press it against the Pliofilm membrane disc 18, so that the gasket 17 is sealably compressed between the disc 18 and the liner 16, to provide a tightly and positively sealed chamber 26.

For purposes of handling a rim or flange 27 is provided on the presure ring 23, and the upper, inner surface of this member is beveled at 28 for guiding access. When the pressure ring 23 is threaded down into the base 11, it bears evenly and with even pressure on the top peripheral surface of the pressure washer 20 to force it with even pressure, and without bowing, to bear upon the membrane disc 18, to thereby complete a sealed sample chamber for enclosing therein a sample of adequate size to be tested.

A hypodermic needle 29, shown in dotted lines in Fig. 2 may be employed and inserted through a slot 30 provided in the base 11, and forced sidewardly through the gasket 17, and a sample, as a fluid sample, injected into the chamber space 26 by manipulation of the hypodermic syringe 31. Otherwise the sample may be placed or poured into the space 26 prior to placing the disc 18 over the gasket 17, and completing the assembly, adding thereto the washer 20 and the pressure ring 23.

Conventionally Geiger counters such as disclosed in catalog SC–50 Automatic Flow Counter of Tracerlab Inc., 130 High Street, Boston 10, Mass., and attached hereto, are employed in measuring radioactivity. In such cases the sample to be measured for radioactivity is placed in a planchet or simple cup, which in turn is placed in a planchet holder shown in the lower central part of Fig. 3 Tower Mechanism Showing Switch Operation shown on page 4 of such catalog. The sample thus presented and supported is entered into the Geiger counter and an inert gas, such as argon, used in testing. Generally the Geiger tube gas employed comprises 99% helium with 1% of a special organic quench. Regardless of the gas employed, however, the introduction of moisture thereinto seriously and adversely affects the accuracy of its functions in taking sample counts.

This possibility of failure of the gas in functioning with moisture therein is inherent in the characteristcs of testing. The degree of ionization of the gas is dependent upon the amount of radioactivity occurring, the measure of radioactivity being in Roentgen measurements or measurements of the number of atomic disintegrations through radioactivity per unit of time per volume of test sample. Thus when a liquid sample in an ordinary planchet or open top type of cup is under test, any evaporation from the test sample passes directly into the test gas and has direct effect upon the test results.

However, when a sealed sample tube is provided, as in the case of the present invention, there can be no such evaporation or gas contamination by moisture with the result that the gas functions for test recording are a much truer record of disintegrations per time unit per volume of test sample and additional accuracy is obtained since the Pliofilm membrane disc is of a material favorable to pass alpha, beta, and gamma rays therethrough.

The invention includes variations, as in cases the liner 16 may be omitted as where the base housing is of an easily cleaned material. Also the structure of the base housing 11 and pressure ring 23 may be varied as to structure of parts providing threads for interengagement. Other variations, modifications and embodiments are considered as well as such may fall within the broad scope of the invention, and within the broad scope of interpretation claimed and merited for the appended claims.

What is claimed is:

1. A sealed radioactivity sample chamber comprising in successively assembled relationship from bottom to top, a base housing having a central cylindrical recess therein of substantially uniform depth and an internally threaded counterbore outwardly of said recess, a disposable liner to seat in and cover the bottom of said recess, an annular gasket to seat upon said liner and of height to extend above said recess, a Pliofilm disc to seat peripherally upon said gasket, a pressure washer with inner diameter substantially the inner diameter of said gasket to seat upon the periphery of said disc and to extend outwardly therefrom to overextend said disc in direction of said counterbore, and a pressure ring threadable into said base housing to bear upon the periphery of said pressure washer with substantially uniform pressure therearound to successively bind said disc, said gasket, and said liner in sealed relation to define a sealed chamber space therebetween of substantially uniform depth into which a radioactive sample may be confined for testing, there being a slot in said base housing to give access for a hypodermic needle to be inserted through said gasket to inject a liquid sample into said chamber space.

2. A sealed radioactivity sample chamber comprising in successively assembled relationship from bottom to top, a base housing having a central cylindrical recess therein of substantially uniform depth and an internally threaded counterbore outwardly of said recess, a disposable liner to seat in and cover the bottom of said recess, an annular gasket to seat upon said liner and of height to extend above said recess, a Pliofilm disc to seat peripherally upon said gasket, a pressure washer with inner diameter substantially the inner diameter of said gasket to seat upon the periphery of said disc and to extend outwardly therefrom to overextend said disc in direction of said counterbore, and a pressure ring threadable into said base housing to bear upon the periphery of said pressure washer with substantially uniform pressure therearound to successively bind said disc, said gasket, and said liner in sealed relation to define a sealed chamber space therebetween of substantially uniform depth into which a radioactive sample may be confined for testing.

3. A sealed radioactivity sample chamber comprising in successively assembled relationship from bottom to top, a base housing having a central cylindrical recess therein of substantially uniform depth and an internally threaded counterbore outwardly of said recess, an annular gasket to seat upon the periphery of the bottom of said recess, a Pliofilm disc to seat peripherally upon said gasket, a pressure washer with inner diameter substantially the inner diameter of said gasket to seat upon the periphery of said disc and to extend outwardly therefrom to overextend said disc in direction of said counterbore, and a pressure ring threadable into said base housing to bear upon the periphery of said pressure washer with substantially uniform pressure therearound to successively bind said disc, said gasket, and said base housing in sealed relation to define a sealed chamber space therebetween of substantially uniform depth into which a radioactive sample may be confined for testing, there being a slot in said base housing to give access for a hypodermic needle to be inserted through said gasket to inject a liquid sample into said chamber space.

4. A sealed radioactivity sample chamber comprising in successively assembled relationship from bottom to top, a base housing having a central cylindrical recess therein of substantially uniform depth and an internally threaded counterbore outwardly of said recess, an annular gasket to seat upon the periphery of the bottom of said recess, a Pliofilm disc to seat peripherally upon said gasket, a pressure washer with inner diameter substantially the inner diameter of said gasket to seat upon the periphery of said disc and to extend outwardly therefrom to overextend said disc in direction of said counterbore, and a pressure ring threadable into said base housing to bear upon the periphery of said pressure washer with substantially uniform pressure therearound to successively bind said disc, said gasket, and said base housing in sealed relation to define a sealed chamber space therebetween of substantially uniform depth into which a radioactive sample may be confined for testing.

5. A sealed chamber comprising in successively assembled relationship from bottom to top, a base housing having a central cylindrical recess therein of substantially uniform depth and a counterbore outwardly of said recess, an annular gasket to seat upon the periphery of the bottom of said recess, a membrane disc penetratable by properties to be tested to seat peripherally upon said gasket, a pressure washer with inner diameter substantially the inner diameter of said gasket to seat upon the periphery of said disc and to extend outwardly therefrom to overextend said disc in direction of said counterbore, and a pressure ring threadably connected to the counterbored part of said base housing to bear upon the periphery of said pressure washer with substantially uniform pressure therearound to successively bind said disc, said gasket and said base housing in sealed relation to define a sealed chamber space therebetween of substantially uniform depth into which a sample may be confined for testing.

6. A sealed chamber as claimed in claim 5 in which the upper, inner edge of said pressure ring is guidably beveled inwardly and downwardly from the top.

7. A sealed chamber as claimed in claim 5 in which said base housing and pressure ring each have a larger diameter flange part thereon for handling.

8. A sealed chamber as claimed in claim 5 in which the upper, inner edge of said pressure ring is guidably beveled inwardly and downwardly from the top, and in which said base housing and pressure ring each have a larger diameter flange part thereon for handling.

References Cited in the file of this patent

UNITED STATES PATENTS

| | | |
|---|---|---|
| 2,637,817 | Herbert | May 5, 1953 |
| 2,681,415 | Liston | June 15, 1954 |
| 2,704,075 | Cherkin | Mar. 15, 1955 |
| 2,819,402 | Watson et al. | Jan. 7, 1958 |

FOREIGN PATENTS

| | | |
|---|---|---|
| 663,519 | Great Britain | Dec. 27, 1951 |